Patented July 3, 1956

2,753,379
PURIFICATION OF CHLOROFLUOROOLEFIN MONOMER

Billy F. Landrum, Belleville, and Ralph L. Herbst, Jr., Westfield, N. J., assignors to The M. W. Kellogg Company, Jersey City, N. J., a corporation of Delaware No Drawing. Application January 12, 1953, Serial No. 330,908

18 Claims. (Cl. 260—653)

This invention relates to the purification of halocarbon monomers and the production of halocarbon polymers from the purified monomer. In one aspect, this invention relates to the polymerization of chlorofluoroolefins. More particularly in this aspect, this invention relates to the polymerization of chloroperfluoroolefinic monomers. It is one particular aspect of this invention to produce polymers of high molecular weight, possessing greatly improved characteristics, which greatly improved characteristics result from the purification of the monomer.

The polymers of the chlorofluoroolefins possess many and varied desirable properties resulting in a high degree of utility which is due to their chemical stability and physical characteristics. The polymerization of perfluorochloroolefins to form high molecular weight polymers, i. e. normally solid or plastic polymers, provides a material which can be fabricated into many useful articles. Because of the fabricability of a plastic or solid polymer, and because of the superior physical characteristics of the perfluorochloroolefins, many ordinary and specialized items may be produced which will find diversified industrial use. Typical of these are chemically resistant valve seats, plugs, gaskets, etc., bottles and specialized containers and other additional materials where the advantages of non-inflammability, high strength, clarity and chemical resistance may be exploited.

The object of this invention is to polymerize haloolefinic monomers by a process which will produce polymers of higher molecular weights than those previously produced by other processes.

It is another object of this invention to produce polymers of the haloolefinic monomers having superior physical properties, such as clarity, no strength temperature (NST), heat resistance, etc.

It is still another object of this invention to produce polymers from the haloolefins in such a way that the molecular weight distribution of the polymer can be controlled.

It is still another object of this invention to purify the monomer prior to polymerization.

It is still another object of this invention to produce a superior polymer product.

There are other objects and advantages of this invention which will become apparent to those skilled in the art on reading the following disclosure.

The term "halocarbon" as used herein is defined as compounds consisting substantially of carbon and halogen, with any degree of saturation, and if the halocarbon is a polymer, it may contain, in addition to the elements which form the compound, other elements, such as hydrogen and oxygen, which are present as impurities in quantities less than about 2%. These other elements are derived from materials used in the polymerization process, as will hereinafter become apparent. The term "perfluorochloroolefins" is defined as a halocarbon, particularly perhaloolefins with any degree of unsaturation consisting of fluorine, carbon, and, preferably as regards this invention, no more than one chlorine atom per carbon atom. The term "fluorochloroolefin" as used herein is generic to a perhalogenated olefin and to a partially halogenated olefin.

This invention relates to the treatment of the monomer used in the manufacture of fluorochlorocarbon polymers, which involves initially contacting the monomers with a terpene type compound, purifying the treated monomer, and subsequently polymerizing the monomer to produce a solid thermo-plastic fluorochlorocarbon polymer, of superior physical and chemical characteristics.

In accordance with this invention a saturated aliphatic carbon compound containing fluorine and chlorine, is treated, such as by dechlorination under suitable conditions in the presence of a metallic dehalogenating agent, to produce a perfluorochloroolefinic monomer for subsequent polymerization. Preferably, the starting material is a saturated fluorochlorocarbon and is dechlorinated. The dechlorination is carried out in the presence of a suitable solvent such as methyl or ethyl alcohol. The crude monomer effluent, containing relatively high and low boiling contaminants, is removed from the dechlorination reactor, and purified. The major contaminants of the crude monomer are the solvent such as methyl alcohol which is water soluble and haloolefins and halo-paraffins which are water insoluble and such other impurities as discussed hereinafter. Accordingly, the crude monomer is preferably water-washed to effectively remove all of the methyl alcohol and any other water soluble impurities. After water washing, the water-washed monomer is then dried under conditions such that the monomer contains usually less than 100 p. p. m., preferably less than 10 p. p. m. of water, and distilled to remove low boiling impurities not removed by water washing. After removal of the low boiling impurities, the monomer bottoms from the first distillation is subjected to a second distillation to remove high boiling impurities not previously removed.

Prior to the water washing step, a terpene compound is admixed with the monomer and the monomer-terpene admixture is maintained at a correlation of temperature and pressure, suitable to each of the subsequent purification processes. The monomer is finally removed by a suitable process e. g. distillation, extraction, sorption, etc., leaving the residue of terpene and terpene reactants, and other high boiling impurities. The monomer is then polymerized to produce a solid polymer.

An important feature of this invention resides in the use of terpene compounds as a means of improving polymers of the perfluorochloroolefins. Prior to this invention, in some instances, difficulty was experienced in producing the high molecular weight polymers from the halocarbons. This was believed due to the presence of various impurities in the monomers which could not be removed by established purification processes. It was discovered that when terpene type compounds were admixed with the monomers and heated, improved polymers were obtained. The terpene is believed to act as a "scavenger," and as such, picks up impurities remaining in the monomer. These impurities are usually obtained during the dehalogenation and purification process as well as from the various recycle operations. They are usually of the $COX_2$ type, where X is equivalent to a halogen or a halogenated carbon atom or atoms, or to hydrogen or hydroxyl groupings; phosgene, trichloroacetyl chloride, and trichloroacetic acid are illustrative. These compounds have been shown to exist in perfluorochloroolefin monomers not treated with terpenes, and their reactivity with terpene compounds has been experimentally established. Other impurities may also react with the terpenes. This theory is offered merely as a means for better understanding of the present invention and is not to be construed as limiting the invention or as the only explanation thereof.

It is within the scope of this invention to contact or admix the perfluorochloroolefin monomers with a terpene compound at that point in the process where the dehalogenated monomer has been washed and dried. Thus the terpene compounds may be introduced into the system before or during the first distillation where low boiling impurities are removed. It is also within the scope of this invention to introduce a terpene compound before or during the second distillation, where high boiling impurities are removed. The preferred method, however, is to introduce terpene compounds prior to the water washing step.

According to this invention the terpene-monomer admixture is heated to a temperature between about 30° C. and the critical temperature of the monomer, for example the critical temperature of trifluorochloroethylene is about 60° C. Sufficient pressure is used to maintain the monomer in the liquid phase, for example autogenous pressures between about 75 and about 220 pounds per square inch gauge are sufficient for trifluorochloroethylene.

The terpene compounds can be removed by various methods; e. g., distillation, extraction with aqueous sulfuric acid, phosphoric acid, absorption with phosphorous pentoxide, etc., thermal diffusion or by washing. The method preferred is by distillation. Most of the halo-olefinic monomers are gas at atmospheric pressure and room temperature, while the terpenes are solids and liquids. The large difference in temperature makes the system particularly adapted to distillation. The heat necessary to distill the monomer, under pressure, may also serve as the heat necessary to bring about the desired reaction. The two steps, heating the mixture and removing the terpenes, may in this manner be combined by distillation. As a rule monomers are distilled before polymerization regardless of their prior history, and therefore removal of the terpenes by distillation is additionally convenient and advantageous. The temperature for distilling the monomers after terpene treatment is between about 30° C., and the critical temperature of the monomer, and at autogenous pressures. The ideal operating point will be based on the characteristics of the monomer being treated. For example in the treatment of trifluorochloroethylene, temperatures between about 40° C. and about 50° C., and pressures between 125 p. s. i. g. and 165 p. s. i. g. are preferred.

The terpene compounds are added to the monomer in quantities of .01% to 10% and preferably between .05% to 1% by weight based on the monomer.

Any of the compounds found in the terpene class can be used in practising this invention. The terpene class is sub-divided into the following groups; terpenes, containing 10 carbon atoms; sesquiterpenes, containing 15 carbon atoms; diterpenes, containing 20 carbon atoms, and triterpenes, containing 30 carbon atoms.

In order to illustrate the structure of the various terpenes adapted to this invention, we are using the numerical system described in "Organic Chemistry," by Paul Karrer, which labels the compounds as shown below:

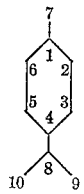

The number of the carbon atom from which the double bond starts is placed as an index after the sign Δ, the sign for unsaturation. If the double bond leads from the nucleus, or is wholly in the side chain, the end of the double bond is indicated by a number in parentheses.

Among the monocyclic terpenes containing 10 carbon atoms useful in the present invention are Δ1-menthene, Δ2-menthene, Δ3-menthene, Δ1(7)-menthene, Δ4(8)-menthene, Δ8(9)-menthene, Δ1,3-terpinene, Δ1,4-terpinene, Δ1,5-phellandrene, Δ1(7)2-phellandrene, Δ1,4(8)-terpinolene, Δ1,8(9)-limonene, Δ3,8(9)-menthadiene, Δ1(7),3-menthadiene (beta-terpinene), Δ1(7),8(9)-menthadiene (pseudolimonene), and dipentene (a racemic mixture of d and 1 limonene).

Among the bicyclic terpenes containing 10 carbon atoms useful in the present invention are alphathujene, beta-thujene, sabinene, carene, alpha-pinene, and beta-pinene. Among the useful sesquiterpenes are bisabolene, zingiberne, cadalene, eudaline, cadinene and alpha-selinene. Alpha-santalene and camphorene are among the useful diterpenes.

The terpenes may be used either individually or as blends depending upon the requirements of the operation. Certain blends may be found to be more advantageous than others depending upon the condition and nature of the monomers to be treated. The preferred additive to chlorotrifluoroethylenic monomer is a mixture of terpinoline and dipentene.

For a better understanding of the present invention, the process will be described in terms of the polymerization of trifluorochloroethylene to produce the homopolymer thereof. It will be understood that the conditions referred to are for purposes of illustration and may be varied without departing from the scope of the invention. It is also to be understood that the process can be applied to the polymerization of other halo-olefinic monomers including copolymerization systems and that this illustration is not limiting. In accordance with the illustrative process, trichlorotrifluoroethane of the 1,2,2, chloro structure, which may be obtained commercially on the open market as Freon 113, is continuously passed to a dehalogenator. A metal dechlorinating agent, such as zinc dust, is also introduced into the dehalogenator, either continuously or intermittently. Although zinc is preferred, various dechlorinating agents may be used, such as tin, magnesium, and iron without departing from the scope of this invention. Fresh solvent for dissolving metal halide formed in the dehalogenator, is continuously or intermittently introduced into the dehalogenator. In this discussion the solvent used in the dechlorination of trichlorotrifluoroethane is a low boiling alcohol e. g. methyl or ethyl alcohol. The amount of metal dechlorinating agent introduced into the dehalogenator, is equivalent to at least the theoretical amount necessary for removal of two halogen atoms from the halocarbon. Preferably, an excess dechlorinating agent is used in effecting the dechlorinating action, and the excess may be as much as 100% or more. It is desirable to have an amount of solvent equivalent in weight to the halocarbon charged, but the amount may vary depending upon the reaction conditions, the quantity generally being less for super atmospheric than for atmospheric pressures; a suitable quantity for operation at atmospheric pressure being 65% of the weight of the halocarbon charged. The mixture of the halocarbon and solvent is vigorously agitated by means of a mechanical stirrer to suspend the metal dechlorinating agent in the mixture in the lower portion of the reactor. Required temperatures are maintained in the liquid phase of the dehalogenator by conventional means, such as heating or cooling coils or a jacket through which a heat exchange medium is passed at the desired temperature. For temperature below about 0° C., a light naphtha may be conveniently used. Water may be used for higher temperatures.

For the dechlorination of trichlorotrifluoroethane to trifluorochloroethylene, pressures between atmospheric and about 300 or 400 pounds per square inch gauge are employed, preferably a pressure between about 120 and 200 pounds per square inch gauge; a particularly suitable pressure being about 150 pounds per square inch gauge. In the preferred form of the invention, the pressure should be sufficiently low at any given temperature to permit vaporization of the trifluorochloroethylene from the liquid phase in the dehalogenator, without substantially vaporizing other constituents of the reaction mixture. Suitable temperatures for the dehalogenator lie between about 0° C. and 200° C. It is preferred to use a temperature between about 40° C. and about 150° C., usually about 100° C. for operations at 150 pounds per square inch gauge. At the higher temperatures the rate of the reaction is increased, which in most instances is desirable. However, excess temperatures may cause undesirable side reactions. In starting up the dehalogenation reactions, a small proportion of a metal halide, such as zinc chloride, may be introduced into the dehalogenator to promote and start the dehalogenation reaction. The metal halide may be introduced separately or in admixture with the dechlorinating agent.

Suitable solvents or diluents for the dehalogenation step comprise the water soluble alcohols, methyl, ethyl, n-propyl, n-butyl alcohol; dioxane, glycerol, butyl carbitol, and the Cellosolves. Other known solvents complying with the general requirements may be used if desired, without departing from the scope of this invention. As stated, the preferred solvents are methyl alcohol and ethyl alcohol.

The temperature and pressure conditions which are maintained in the dehalogenator, according to the preferred embodiment of this invention, are such that the perhalo-olefins formed therein as the desired product are vaporized. The halo-olefin vapor leaves the reactor together with saturated halocarbons and solvent alcohol which are present as the result of entrainment and the formation of azeotropes. The major proportion of the halocarbon and solvent are retained in the liquid phase in the dehalogenator.

The vapor leaving the dehalogenation reactor is cooled thereby condensing a major portion of the entrained alcohol and saturated halocarbons which are returned to the dehalogenator. Due to the presence, in the monomer, of additional water soluble and insoluble, low and high boiling impurities, such as, phosgene, trichloroacetic acid, etc., unremoved solvent and saturated halocarbons, subsequent purification processes must be employed if satisfactory yields and reproducible results in the polymerization process are to be obtained.

It has been discovered, as stated above, that admixing a terpene compound with a monomer, heating the resulting admixture and subsequently recovering the monomer from the admixture, prior to polymerization, results in the production of polymers of superior characteristic than those monomers not so treated. The terpene compound may be admixed with the monomer at any convenient time prior to polymerization of the monomer. In the preferred embodiment of this invention a terpene compound is admixed with the monomer prior to the water washing process. The crude monomer is admixed with a terpene compound in percentages from about 0.01 to about 10 percent of terpene and preferably 0.05 to 1 percent of terpene by weight based on the monomer.

Then, as much as possible of the water soluble impurities, such as solvent employed in the dechlorination step, are removed by washing the monomer with water. It has been discovered that quantities of solvent, such as methyl alcohol, present in the monomer greater than 100 parts per million, seriously retards the polymerization and produces an inferior polymer. It has been further discovered that water washing the monomer will remove substantially all of the solvent, reducing the methyl alcohol content of the monomer substantially below the maximum 100 parts per million.

In order to remove solvent, the monomer, which has been admixed with a terpene compound, as described above, is passed to a water washing zone. Suitable conditions of water washing include a pressure between atmospheric and about 500 pounds per square inch gauge, preferably about 150 pounds per square inch gauge and a temperature between about 25° C. and 100° C., preferably above about 38° C. Water washing, under these preferred conditions, with excess water will reduce the water soluble content to less than about 25 parts per million, or lower. The monomer, thus purified by water washing, is then dried, such as by contact with calcium sulfate, to reduce the water content below 100 parts per million, preferably below 10 parts per million in order to prevent corrosion of the equipment.

This washed and dried monomer-terpene admixture is then subjected to a fractional distillation to remove low boiling impurities, such as trifluoroethylene, etc. In this first fractional distillation, a bottom temperature between about 30° C. and about 60° C. is maintained. A preferred temperature is about 50° C. in which case the top temperature of the distillation column is maintained at about 34° C. Low boiling impurities are removed from the distillation column as a vapor and are condensed for possible subsequent recovery. The monomer-terpene admixture, free of low boiling impurities, is recovered as a liquid from the lower portion of the distillation column. This liquid monomer-terpene admixture is then subjected to a second fractional distillation to remove high boiling impurities including terpene and terpene reactants. In this second fractional distillation, the monomer is removed overhead from the distillation column as a vapor and is condensed and accumulated. Bottom temperature of the second fractional distillation column is maintained between about 30° C. and about 60° C. A preferred temperature is about 50° C., in which case the top of the column is maintained at about 43° C. to about 49° C.

Thus, in the preferred operation of this invention, two steps, that is distillation to remove high boiling impurities and heating of the terpene-monomer admixture, are combined into one. While the method described above is preferred, it is understood that various modifications may be made in the process, such as changing the sequence of purification steps or admixing the terpene compound with the monomer at other than the preferred point, as explained above, without changing the scope of this invention.

Polymerization of the fluorochloro-olefin monomer, obtained from the above distillation and terpene treatment, is effected under suitable conditions with or without the presence of a suitable promoter material. According to one embodiment of this invention, trifluorochloroethylene is polymerized in the presence of an organic peroxide promoter, such as a halogenated acylperoxide, to produce a normally solid polymer having good physical and chemical characteristics. A particularly suitable promoter for this embodiment of the invention comprises bis-trichloroacetyl peroxide. The amount of trichloroacetyl peroxide used varies between about 0.01 and about 0.50% of the monomer in the reaction mixture for the solid polymer product. In general, promoter concentration is dependent upon the product desired, thus by increasing the concentration of promoter a decrease in the molecular weight of the desired polymer is obtained and by decreasing the promoter concentration an increase in molecular weight is obtained.

Various halogenated acyl and other halogenated organic peroxides such as trifluoroacetyl peroxide, difluorochloroacetyl peroxide, 2,4-dichloro-benzoyl peroxide, trifluorodichloro-propionyl peroxide, tetrafluorochloropropionyl peroxide, chloroacetyl peroxide, and dichlorofluoroacetyl peroxide have been found capable of promoting the polymerization reaction to produce a solid or plastic polymer.

When a peroxide promoter is used for polymerization at low temperatures to produce a solid polymer, it is desirable to dissolve the promoter in a suitable solvent since the promoter is a solid. In accordance with the illustrative process, such solvent should have a boiling point below the boiling point of the polymer product, and higher than the boiling point of the monomer. The solvent should also be miscible with the halo-olefin. The quantity of solvent containing the promoter employed is preferably between about 1 and about 20% of the olefin, but larger or smaller amounts may be used without departing from the scope of this invention. Preferably, the solvent used for the promoter in the polymerization of trifluorochloroethylene to a solid polymer is trichlorofluoromethane.

The promoter is introduced into the reactor after being admixed with the solvent. For the production of a normally plastic polymer, a preferred temperature between about −20° C. and about 50° C. is employed depending upon the catalyst and operating conditions used. When using bis-trichloroacetyl peroxide, as the catalyst for the production of a solid polymer, temperatures between about −20° C. and about 50° C., preferably between about −10° C., and about 25° C., and pressures up to that in which decomposition becomes appreciable may be employed. At the higher pressure higher temperatures may be employed, which decrease the time required for the polymerization of trifluorochloroethylene. It is preferred, therefore, to operate at super atmospheric pressures in excess of about 50 pounds per square inch gauge, since at elevated temperatures and at super atmospheric pressures a residence time of minutes or hours is sufficient to obtain an economical yield of polymer.

The primary purpose of the trichlorofluoromethane solvent in the production of solid polymers, as described heretofore, is for dissolving the solid organic peroxide promoter in order to assure intimate contact between monomer and promoter and in order to facilitate handling of the catalyst. Solvents of this type, i. e. promoter solvents, comprise carbon tetrachloride, difluorochloromethane, bromotrichloromethane, trifluorochloromethane, 1,2,2,2, tetrachloroethane, pentafluorochloroethane, trichlorofluoroethane, dichloroperfluorocyclobutane, and perfluoroheptane.

For effecting thermal polymerization reactions in the reactor without a catalyst or with a relatively less active catalyst, relatively high temperatures and pressures are required. Temperatures as high as 600° C. or higher, and pressures as high as 30,000 pounds per square inch gauge, are within the scope of this invention, particularly for use in thermal polymerization. The time required for thermal polymerization, as with catalytic polymerization, varies with the conditions and desired product.

The polymerization reactor for the above described process may comprise a steel bomb, surrounded by a suitable heat exchange medium, such as a light naphtha or water, for maintaining the temperature substantially constant, about −15° C., during the polymerization reaction. When a bomb type reactor is used for polymerization, several reactors are used so that the polymerization step of the process may be continuous, for example, while one reactor is being charged or the polymerization reaction effected, another bomb is heated to evaporate the solvent and unreacted monomer, etc.

The polymer is removed from the polymerization reactor in the form of a porous plug and treated, as by heating, to remove solvent and unpolymerized monomer. After treatment, solid polymer is recovered as a product of the process.

In another embodiment of the present invention, polymerization of the trifluorochloroethylene monomer, obtained as a product of the terpene purification treatment described above, is accomplished by a monomer-polymer slurry process under conditions similar to those described hereinbefore, but with a different type of reactor and manipulative steps. In this process the purified liquid monomer, for example, trifluorochloroethylene at a temperature of about 0° C. and a pressure of about 30 pounds per square inch gauge, is passed to the lower portion of a horizontal polymerization chamber. Trichloromonofluoromethane containing a dissolved promoter, of suitable concentration such as trichloroacetyl peroxide, is also introduced into the lower portion of the polymerization chamber.

The polymerization chamber comprises a horizontal cylindrical chamber containing baffles such that the chamber is divided into three sections. The monomer polymer slurry in the chamber is maintained in a state of agitation in each of the polymerization sections by use of conventional stirrers. The bottom of the baffles contain openings so that the monomer polymer mixture may flow horizontally from the entrance of the chamber to the exit thereof. The liquid level in the chamber is maintained just below the top of the baffles. The chamber is maintained at a temperature of about 0° C. and at a pressure of about 30 pounds per square inch gauge. A monomer polymer slurry containing less than about 12% polymer, preferably about 5 to 7% polymer, is withdrawn from the exit end of the horizontal chamber and passed into a spray dryer. The outlet of the spray dryer is maintained at about 65° C. Vaporized monomer and suspended finely divided solid polymer are passed from the spray dryer to a cyclone separator in which solid polymer is separated from vaporized monomer. Dried polymer is passed from the cyclone separator to a collection point or lock hopper. The lock hoppers are used alternately; when one lock hopper is filled, it is emptied by passing solid polymer to a screw conveyor, thence to a storage hopper. This material is passed through conventional extrusion apparatus for extruding the polymer in preparation for packing and shipping.

Such vaporized monomers as are produced in the various operations of this process, for example, in the polymerization chamber, spray dryer, and cyclone separator, are recycled through the above described purification processes including the terpene treatment, where necessary, and are condensed and collected for subsequent reintroduction into the polymerization zone.

Polymerization of the trifluorochloroethylene monomer obtained as a product of the terpene purification treatment, described above, may also be accomplished in an aqueous suspension medium which is different from the bomb type and the monomer-polymer slurry type processes. In this process, the monomer is admixed with the aqueous suspension medium in a polymerization zone which is maintained at the approximate conditions for polymerization and under sufficient pressure to maintain the aqueous solution and the monomer as a liquid. Under the preferred conditions of polymerization, the monomer and water are agitated by conventional means in the reaction zone, so as to intimately disperse the monomer in the aqueous suspension medium. The monomer and polymer are substantially insoluble in the aqueous suspension medium. Separation of the polymer from the water phase may be effected by settling and decantation, by filtering, by centrifuging, by evaporation or by other conventional methods.

Quantity of water employed as the aqueous suspension medium is usually between 0.5 to about 10 times by volume of the quantity of total monomer present in the reaction zone. Preferably, the quantity of water is between 1 and 5 times the total monomer in the reaction zone.

The temperatures employed for the polymerization will depend to a certain extent upon the particular monomer being polymerized. In the production of solid polymers of trifluorochloroethylene, temperatures between about 0° C. and about 30° C. or 40° C. are preferred. In general, the temperature range is between about 0° C. and about 25° C. Pressure range is about 20 to about 1500 pounds per square inch gauge, being selected so that the monomer and water are maintained in the liquid state.

Time of polymerization also depends upon the particular monomer being polymerized and also upon such factors as the molecular weight of the ultimate polymer, temperature of polymerization and the types of promoters and activators being employed. In general, the polymerization time is between about 10 minutes and about 50 hours and usually between about 5 hours and about 40 hours.

The aqueous phase type of polymerization usually requires a suitable promoter agent for effecting the polymerization of the monomer in a reasonable length of time and also to produce a polymer of the desired molecular weight. These promoting agents fall into three general classes; promoters, activators and accelerators. In almost all instances a promoter must be used. Such promoters comprise the inorganic peroxides, such as, the perborates, persulfates, perphosphates, percarbonates, barium and hydrogen peroxide. Of particular value are the water soluble salts of the peracids, such as, sodium, potassium, calcium, barium, and ammonium salts of the persulfuric and perphosphoric acids which may be prepared in the conventional manner by electrolytic oxidation of the salts of the corresponding oxy acids. Suitable promoter concentration lies within the range of 0.003 molar to about 0.1 molar. In the polymerization of trifluorochloroethylene to produce the solid polymer thereof, having a softening point of about 200° C., a promoter concentration between about 0.003 and about 0.07 molar, or about 0.01 and about 2% by weight, based on water, is preferred. Promoters are usually used in conjunction with an activator such as sodium bisulfate, sodium hydrosulfate, sodium bisulfite and trimethyl amine, or in general any water soluble reducing agent. These activators are generally employed in concentrations similar to the concentration of the promoter employed. Equal molar amounts of promoter and activator are preferred.

Buffering agents may also be employed to obtain the optimum pH conditions. For example, when an alkaline pH is desired buffers such as, borax, disodium phosphate, sodium carbonate, ammonium carbonate, and sodium acetate may be used, for an acid pH, acetic acid, propionic acid and monosodium phosphate may be employed. A pH range between about 1 and about 4 is preferred.

Since the use of accelerators substantially increases the yield of polymer, and decreases the time of polymerization, they are usually employed. Generally accelerators are ionizable, inorganic, water soluble salts, and when in the oxidized state are more readily reduced than the promoter and in the reduced state are more readily oxidized than the activator. The salts of the heavy metals such as iron, maganese, and chromium are preferred; other accelerator elements comprise cobalt, silver, copper, nickel, molybdenum, and iodine. The accelerator element is introduced into the agitated reaction mixture in the form of the water soluble salt, preferably as the low valence form of the accelerating element, and after introduction and dissolution therein the salts ionize. Various salts of the accelerating element comprise the hydroxides, carbonates, sulfates, phosphates, nitrates, and chlorides. In the polymerization of trifluorochloroethylene, in a potassium persulfate-sodium bisulfite aqueous system, an iron sulfate is admixed with the reaction mixture in an amount sufficient to maintain the concentration of the accelerating element between about 10 and about 100 p. p. m. during the polymerization.

Since the presence of impurities, such as alcohols, ketones, and other water soluble organic compounds, tends to inhibit the polymerization of trifluorochloroethylene, the use of purified or distilled water is preferred.

It is preferred that the polymerization be effected in a vessel which is not capable of being attacked by the ingredients employed in the polymerization. Suitable corrosion resistant materials comprise stainless steel, Inconel, Monel, silver, nickel, glass, or fluorinated solid polymers.

The liquid in the reaction zone, must be vigorously agitated, in order to maintain the reactant and promoting agents in intimate contact. In general, any system capable of maintaining a mechanical emulsion without the use of detergents will be applicable since, in most instances, detergents are harmful to the polymerization reaction. Thus, mechanical stirrers or forced circulation of the liquid through the orifices may be used.

The polymers and copolymers prepared from monomers treated with terpenes exhibit higher molecular weights, improved thermal stability and clarity. For example, polymeric chlorotrifluoroethylene, having an N. S. T. of 325° C., prepared from purified monomer but which had not been terpene treated, degraded to an N. S. T. of 220° to 230° C. in six hours at a temperature of 300° C. while polymers having an N. S. T. of 330° C. prepared from purified and terpene treated monomer, showed no degradation of N. S. T. under these conditions. Another thermal test showed that the polymers prepared from purified monomers but not terpene treated, degraded in N. S. T. from 325 C. to 220°–230° C. over a period of three days at a temperature of 275° C. Polymers, prepared from purified and terpene treated monomers, having an N. S. T. of 330° C., only degraded to an N. S. T. of 323° C.

The higher molecular weight of the improved polymer has been shown by both viscosity tests and fractionation. Viscosity measurements were taken in solutions composed of 0.5% by weight of the respective polymers in dichlorobenzotrifluoride. The polymer, prepared from purified but not terpene treated chlorotrifluoroethylene monomer, having an N. S. T. of 325° C., exhibited a viscosity of one centistoke; while the polymer, prepared from purified and terpene treated chlorotrifluoroethylene monomer, having an N. S. T. of 330° C., exhibited a viscosity of 2.7 centistokes. This clearly indicated that the terpene treated monomer forms polymers of higher molecular weight than does the untreated monomer in the same system. Even after heating the improved polymer for six hours at a temperature of 300° C., its viscosity in a dichlorobenzotrifluoride solution was greater than the viscosity of the unimproved polymer, which had not been heated.

In the table below, additional data are presented which clearly indicate the distinction between polymers prepared from purified, terpene treated, monomers, and polymers prepared from purified but not terpene treated monomers. The polymers discussed in the table were prepared from trifluorochloroethylene monomer. The designation "Standard Process" in the table refers to polymers prepared from purified but not terpene treated monomers; the designation "Terpene Process" refers to polymers prepared by techniques identical to the "Standard Process" except that a terpene treatment was included in the purification of the monomer. Since no strength temperature and solution viscosity reflect the molecular weight of the polymer under consideration, the effect of terpene treatment on the ultimate polymer is made obvious by the table of data, below. It is evident that polymers, prepared from terpene treated monomers, possess higher molecular weights, greater heat stability etc., than polymers prepared from monomers not so treated.

*Heat degradation studies*

DEGRADED AT 300° C.

| Time (hours) | Standard No Strength Temperature, ° C. | | Solution Viscosity [1] | |
|---|---|---|---|---|
| | Standard Process | Terpene Process | Standard Process [2] | Terpene Process |
| 0 | 321 | 331 | 0.98 | 2.02 |
| 1 | 292 | 331 | 0.78 | 1.73 |
| 3 | 257 | 330 | 0.60 | 1.35 |
| 6 | 220 | 329 | 0.45 | 1.19 |

DEGRADED AT 275° C.

| | | | | |
|---|---|---|---|---|
| 24 | 288 | 329 | 0.74 | 1.50 |
| 48 | 260 | 330 | 0.66 | 1.08 |
| 72 | 250 | 323 | 0.61 | 1.13 |

[1] In dichlorobenzotrifluoride solvent.
[2] Converted from 1,1,3, trifluoropentachloropropane solvent.

Further evidence of increased molecular weight has been obtained through fractionating the polymers. Less than 10% of the polymer, prepared from the purified but not terpene treated monomer, having an N. S. T. of 325° C., has molecular weight of above 200,000. It has been found, by fractionation, that 60% of the purified and terpene treated polymer has a molecular weight substantially above 200,000.

The polymers prepared from non terpene treated monomers often suffer from cloudiness. However, the polymers, whose starting materials were first processed as described in this invention, proved to be clear and transparent.

To facilitate a fuller and more complete understanding of the subject matter in this invention a specific example follows but it is clearly to be understood that this example is provided by way of illustration and should not be considered as unduly limiting the invention.

A mixture of dipentene and terpinolene in the amount of 0.05% by weight based upon the monomer charge, was added to chlorotrifluoroethylene monomer. The mixture was distilled at a temperature of 47° C. to 49° C. and at a pressure varying between about 150 p. s. i. g. and about 160 p. s. i. g. The monomer was then polymerized in the presence of bis-trichloroacetyl peroxide catalyst, at a temperature of —15° C., under autogenous pressure for a period of seven days. The resulting polymer was pressed into a series of tough, transparent, flexible and thermally stable films. Pressing times of about 5 minutes to about 15 minutes at a temperature of 475° F. and a pressure of 5,000 p. s. i. g. were used.

We claim:

1. A process for purifying a fluorochloroolefin monomer which comprises admixing said monomer with a cyclic terpene at an elevated temperature and recovering the purified fluorochloroolefin monomer from the resulting admixture.

2. The process of claim 1 in which the terpene is dipentene.

3. The process of claim 1 in which the terpene is Δ1,4,(8) terpinolene.

4. The process of claim 1 in which the terpene is Δ3,8,(9) menthadiene.

5. The process of claim 1 in which the terpene is Δ1,8,(9) limonene.

6. The process of claim 1 in which the terpene is a mixture of dipentene and Δ1,4,(8) terpinolene.

7. A process for purifying a fluorochloroolefin monomer which comprises admixing said monomer with a cyclic terpene, maintaining said admixture of monomer and terpene at a temperature between about 30° C. and the critical temperature of the monomer and recovering the purified fluorocholoroolefin monomer from said admixture.

8. The process of claim 7 in which said fluorochloroolefin is 1-chloro, 1-fluoroethylene.

9. The process of claim 7 in which said fluorochloroolefin is trichlorofluoroethylene.

10. The process of claim 7 in which said fluorochloroolefin is perfluoropropene.

11. The process of claim 7 in which said fluorochloroolefin is chloropentafluoropropene.

12. The process of claim 7 in which said fluorochloroolefin is 1,1-difluoropropene.

13. A process for purifying a perfluorochloroolefin monomer which comprises admixing said monomer with a cyclic terpene, maintaining the resulting admixture at a temperature between about 30° C. and the critical temperature of the monomer and at autogenous pressure, and recovering the purified monomer from said admixture by distillation.

14. A process for purifying a perfluorochloroolefin monomer which comprises admixing said monomer with a cyclic terpene, maintaining the resulting admixture at a temperature between about 30° C. and the critical temperature of the monomer and at autogenous pressure, and recovering the purified monomer from said admixture by extracting with an aqueous acid selected from the group consisting of sulfuric acid and phosphoric acid.

15. A process for purifying a perfluorochloroolefin monomer which comprises introducing a chlorofluoro aliphatic compound into a monomer production zone, forming the corresponding fluorochloroolefin, removing from said monomer production zone a monomer stream of said fluorochloroolefin contaminated with various water soluble impurities, admixing said contaminated monomer with a cyclic terpene, in a water washing zone washing resulting monomer-terpene admixture with water to remove water soluble impurities, removing the washed monomer-terpene admixture from said water washing zone and drying same with an absorption agent, heating said admixture of cyclic terpene and monomer at a temperature between about 30° C. and the critical temperature of the monomer and at autogenous pressure for a sufficient period of time to remove impurities, and removing from said admixture a purified monomer stream.

16. A process for purifying a perfluorochloroolefin monomer which comprises introducing a chlorofluoro aliphatic compound into a monomer production zone, forming the corresponding fluorochloroolefin, removing from said monomer production zone a monomer stream of said fluorochloroolefin contaminated with water insoluble high and low boiling impurities and water soluble impurities, admixing said contaminated monomer with a cyclic terpene, in a water washing zone washing said monomer-terpene admixture with water to remove water soluble impurities, removing the washed monomer-terpene admixture from said water zone and drying same with an absorption agent, distilling said washed and dried monomer-terpene admixture to remove water insoluble low boiling impurities, recovering from said distillation monomer-terpene admixture partially purified, maintaining the resulting admixture of cyclic terpene and monomer at a temperature between about 30° C. and the critical temperature of the monomer and at autogenous pressure for a sufficient period of time to remove additional impurities, subsequently distilling said admixture and recovering from said second distillation a purified monomer.

17. A process for purifying trifluorochloroethylene monomer which comprises introducing trichlorotrifluoroethane into a monomer production zone, forming the corresponding trifluorochloroethylene, removing from said monomer production zone a monomer stream of said trifluorochloroethylene contaminated with water insoluble high and low boiling impurities and water soluble impurities, admixing said contaminated monomer with a cyclic terpene, in a water washing zone washing said monomer-terpene admixture with water to remove water soluble impurities, removing the washed monomer-terpene admixture from said water zone and drying same with an absorption agent, distilling said washed and dried monomer-terpene admixture to remove low boiling impurities, recovering from said distillation a monomer-terpene admixture partially purified, heating the resulting admixture of cyclic terpene and monomer at a temperature between about 30° C. and about 60° C. at autogenous pressure for a sufficient period of time to remove additional impurities, distilling said admixture and recovering from said second distillation a purified monomer.

18. A process for purifying trifluorochloroethylene monomer which comprises passing trichlorotrifluoroethane into a dehalogenation zone, in said dehalogenation zone dehalogenating said trichlorotrifluoroethane in the presence of zinc as a dehalogenating agent to produce trifluorochloroethylene, removing a stream of trifluorochloroethylene containing relatively high low boiling water soluble and insoluble impurities, phosgene and trichloroacetyl chloride, admixing said stream of trifluorochloroethylene from said dehalogenation zone with a cyclic terpene, in a water washing zone water washing the resulting monomer-terpene admixture under conditions to remove water soluble impurities therefrom, removing a water washed admixture of cyclic terpene and trifluorochloroethylene from said water washing zone, drying said admixture of water washed trifluorochloroethylene and cyclic terpene with calcium sulphate to reduce the water content thereof less than 100 p. p. m., passing said water washed admixture to a first distillation zone, distilling said water washed admixture in said distillation zone at a bottoms temperature between 30° C. and 60° C. whereby a relatively low boiling fraction comprising low boiling contaminants is removed overhead and a high boiling fraction comprising trifluorochloroethylene, cyclic terpene and the remaining impurities is removed as a bottoms product, passing said bottoms trifluorochloroethylene-terpene admixture from said first distillation zone to a second distillation zone, heating in said second distillation zone at a temperature between about 30° C. and about 60° C. and at a pressure between about 75 and about 220 pounds per square inch gauge whereby cyclic terpene reacts with phosgene and trifluoroacetyl chloride to form a residue containing the reaction products, unreacted cyclic terpene, and high boiling water insoluble impurities and removing the trifluorochloroethylene monomer from said residue, by distillation at a temperature between 30° C. and 60° C. and a superatmospheric pressure.

References Cited in the file of this patent

UNITED STATES PATENTS 2,579,437    Miller _____ Dec. 18, 1951